Figure 1:
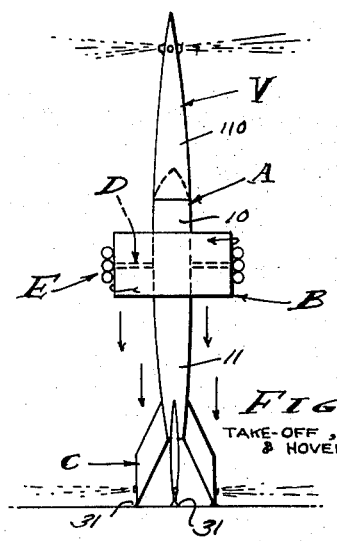

May 24, 1966  J. B. REICHERT  3,252,673
SUPERSONIC VTOL AIRCRAFT AND LAUNCH VEHICLE
Filed June 26, 1964  2 Sheets-Sheet 1

TAKE-OFF, LANDING & HOVER

HORIZONTAL FLIGHT

INVENTOR.
JAMES B. REICHERT
BY
AGENT

May 24, 1966  J. B. REICHERT  3,252,673
SUPERSONIC VTOL AIRCRAFT AND LAUNCH VEHICLE
Filed June 26, 1964  2 Sheets-Sheet 2

INVENTOR.
JAMES B. REICHERT
BY
AGENT

United States Patent Office 3,252,673
Patented May 24, 1966

3,252,673
SUPERSONIC VTOL AIRCRAFT AND
LAUNCH VEHICLE
James B. Reichert, 564 Midvale, Apt. 7,
Los Angeles, Calif.
Filed June 26, 1964, Ser. No. 378,308
12 Claims. (Cl. 244—12)

This invention relates to a vertical take-off and landing aircraft and launch vehicle capable of supersonic flight with reduced drag characteristics, it being a general object of this invention to provide a high speed aircraft capable of economical cruise at a high Mach number, for example at Mach 3.0.

Conventional aircraft with straight wings and usual swept-wing aircraft are plagued with increasing drag characteristics up to Mach 1.0, followed thereafter as the Mach number is increased by a gradual tapering off or decreasing drag value. Obviously, thrust is necessary to overcome drag, and it is therefore necessary to maintain substantial thrust at all times when operating above Mach 1.0, since the drag ratio of said conventional aircraft will not return to a low value. For instance, by a low value drag ratio I mean a value such as exists when operating the aircraft up to Mach 0.8 and substantially below Mach 1.0.

The aircraft that I provide is of ring-wing configuration and capable of economical cruise speeds at a high Mach number. With the structural relationship of parts and elements that I will hereinafter describe there is a relatively wide range of cruise speeds, within which range drag characteristics are reduced to economic minimums. Instead of the ordinary gradual decrease in drag as the Mach number increases, there is an area within which drag drops to a ratio of low value comparable in magnitude to a value that exists when operating up to Mach 0.8 and well below Mach 1.0. As a result, within said area of low drag ratio value a high degree of economy is realized in comparison to the high rate of forward speed.

In the two preceding paragraphs comparative speed and economy are discussed. Equally important and beneficial, however, are the VTOL and flight characteristics of the aircraft hereinafter described. The ducted fan principle is employed for high performance take-off and landing. There is gyro-stability for hovering. The power plant is operable in all cases at efficient speeds or rates. These features are inherent in this aircraft as will become apparent from the following description and the drawings.

An object of this invention is to provide lift, propulsion and stability in a winged aircraft, and which is efficient for hovering as well as for supersonic cruising speeds and as a launch vehicle.

It is an object of this invention to provide a wing that causes a cancellation of the compression shock waves generated by the aircraft fuselage, a wing that shrouds a fan or propeller used for VTOL and hovering, and a wing that creates gyro stability for the aircraft.

It is another object of this invention to provide a fuselage and wing relationship wherein the wing revolves and carries propulsion means that operate continuously at efficient rates.

It is still another object of this invention to provide an aircraft of the type hereinabove referred to and which is convertible from a hovering type craft to a high speed craft in horizontal flight. The parts and elements of this aircraft are so arranged and interrelated and suitably controlled whereby said conversion is practical and easily accomplished at the will of the pilot, whereby efficiency is realized both in hovering and at high forward speeds, and wherein stability is readily enhanced during hovering by the use of reaction rockets.

It is also an object of this invention to provide an air foil which supports combustion at high forward speeds and thereby operates as a ram-jet engine when fuel injection nozzles introduce fuel into the air compressed thereby.

Figure 2:
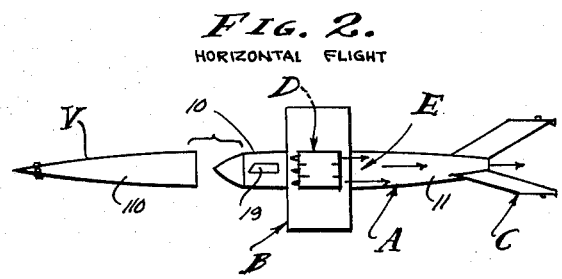
Figure 3:
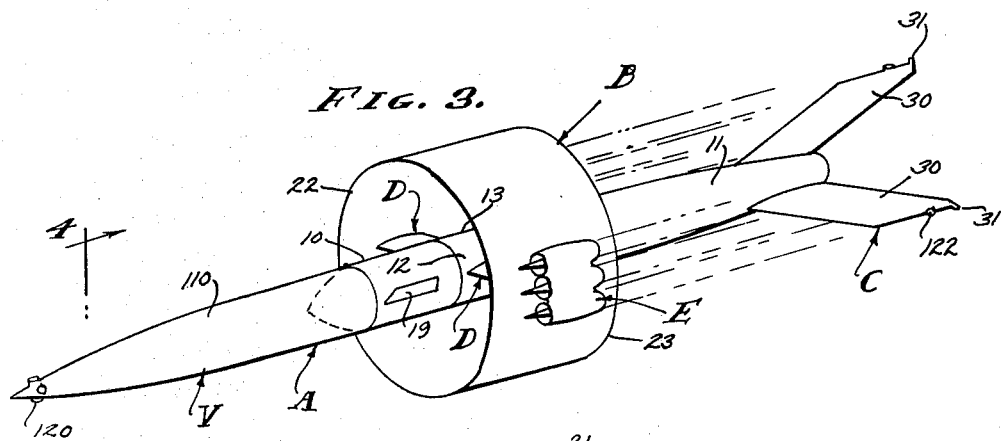
Figure 4:
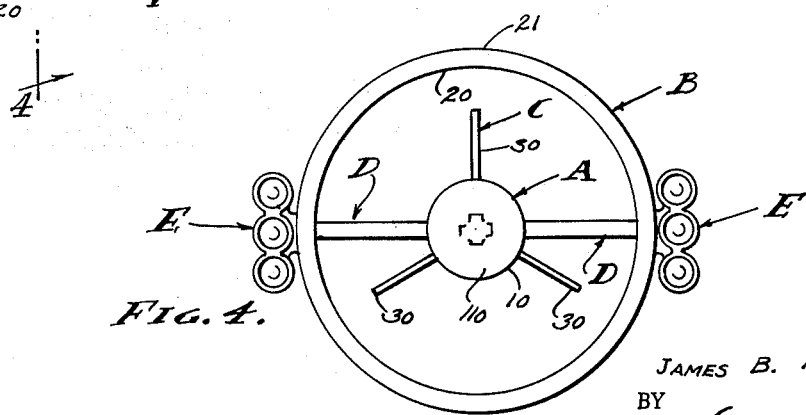
Figure 5:
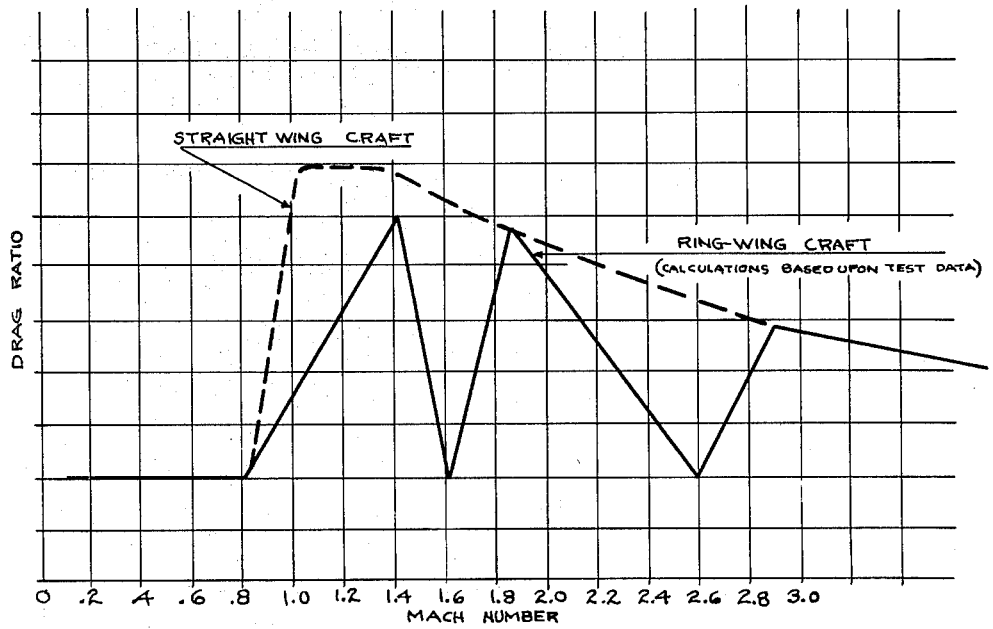
Figure 6:
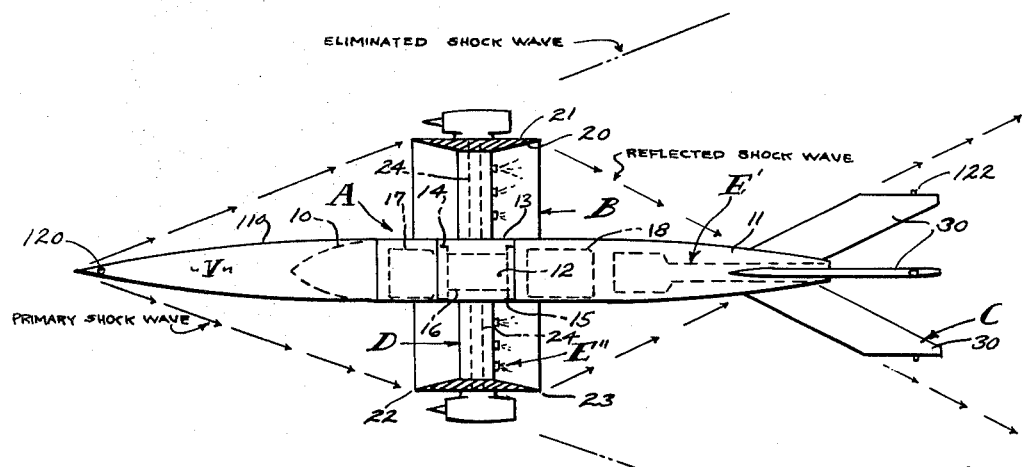

The various objects and features of this invention will be fully understood from the following detailed description of the typical preferred form and application thereof, throughout which description reference is made to the accompanying drawings, in which:

FIGS. 1 and 2 show the configuration of the aircraft that I provide, FIG. 1 illustrating the disposition of the craft for vertical take-off and landing for hovering, and FIG. 2 showing the disposition of the craft for high speed horizontal flight. FIG. 3 is an enlarged perspective view of the aircraft as it appears in FIG. 2. FIG. 4 is a front view taken as indicated by line 4—4 on FIG. 3. FIG. 5 is a graph showing the comparative drag ratio values between conventional straight wing aircraft and the present invention. FIG. 6 is a view showing the emanation of and cancellation of shock waves in accordance with the present invention.

The aircraft of this invention is basically of the supersonic type and is convertible into a VTOL configuration capable of vertical take-offs and landings and also hovering. A major drawback in conventional aircraft is the high rate of speed required for take-off and landing and in the inability to hover. Vice versa, the drawback in vertical take-off aircraft is the inability to acquire high rates of forward speed. The craft herein disclosed is capable in all of these categories and employs a ring-wing provided with circumferentially spaced thrust units and radial blades extending inwardly between the ring-wing and axially disposed fuselage. The radial blades are adjustably mounted for movement about their radial axes so that a ducted fan, or propeller, effect is gained for thrusting the craft perpendicularly when it is vertically disposed. The said ring-wing is revolved by thrust of the circumferentially placed units, although it is contemplated that said units can drive the blades individually in which case the ring-wing can be fixed relative to the fueslage. Upon gaining sufficient altitude and speed the craft can be put into horizontal flight by adjusting the axes of the thrust units and by turning the radial blades so that they lie in planes coincidental with the fuselage axis. As supersonic speeds are reached expansion shock waves emanate from the fuselage and at or within the designed cruise speed these shock waves are intercepted by the ring-wing and (are reflected back onto said fuselage so to speak) whereby said waves are effectively cancelled.

Said ring-wing aircraft is shown best in FIG. 3 of the drawings as involving, generally a fuselage A, a ring-wing B, an empennage C, and in the preferred form it involves radial blades D and thrust means E. A feasible aircraft could involve the bare essential elements A, B and C with other and more conventional thrust means for propelling the craft, and therefore, the invention is considered broadly as comprising these three basic essentials. However, in order to provide a craft capable of VTOL and hovering characteristics the blades D and thrust means E are combined therewith as hereinafter described.

The fuselage A is an elongated streamline object preferably of round cross-section and with a tapered nose section 10 and a rearwardly tapered tail section 11. At or near the center portion of the fuselage and intermediate the nose and tail sections 10 and 11 I provide a wing mounting 12, and in the case under consideration said mounting rotatably carries the ring-wing B, whereby said wing rotatably surrounds the fuselage A. The wing mounting 12 can vary widely and is shown as a hub element 13 carried on spaced bearings 14 and 15 supported on the central fuselage portion in the form of a tubular element 16. Assuming that the ring-wing B rotates about the center of gravity of the craft, the various loads are equally distributed fore and aft, there being fuel cells at 17 and 18, and a cabin at 19. It is to be understood that other equipment and cargo can be distributed as circumstances require.

The right-wing B is an element of the configuration its name implies and it is a 360° element that completely surrounds and encircles the fuselage A. The ring-wing B is concentric with the axis of the fuselage A and it has substantial chord length with its inner camber 20 inwardly curved and opposed to and equidistant from the exterior of the fuselage. The outer camber 21 is straight and of cylindrical form, and it joins the camber 20 at knife-edged leading and trailing edges 22 and 23. The ring-wing B has substantial thickness for circumferential rigidity and it is supported from the hub element 13 by radially disposed struts 24. The struts 24 mount the blades D, later described, and there may be as many struts 24 as there are blades required. In practice, a pair of diametrically opposite struts 24 are provided and these struts are rigid tubular elements that extend intermediate the hub element 13 and ring-wing B. It will be apparent that said struts can conduct fuel and house controls that extend to the thrust means E.

The empennage C can vary widely in detail of construction and is shown as a three element structure having a two-fold purpose. As clearly indicated in FIG. 1 of the drawings the empennage C acts in the capacity of a ground support means, and from the remaining figures it is apparent that the empennage C acts in the capacity of control means. In the latter capacity said means employs at least two distinct phenomenon, namely, precessing as applied to gyroscopic action and lateral deflection of air in the usual aircraft sense. The empennage C is, therefore, a combined landing gear and control surface means, comprising, for example, three laterally projecting legs 30, each in the form of a stabilizing fin. As a landing gear, for example, the legs 30 are spaced 120° apart and form a tripod with ground engaging feet 31 at their outermost terminal ends. As a control means, the legs 30 are vane-shaped and pivotally mounted so that each turns as a rudder or stabilizer of a conventional aircraft. When in the VTOL attitude and when hovering there is gyro stability caused by the rotating ring-wing B, and in this case the rudder-like legs 30 are manually controlled to effect precession of the gyroscopic action whereby control is gained during hovering and vertical disposition of the fuselage A. It will be apparent that said control by precession is gained by deflection of the down wash from the blades D.

The blades D are rotatably mounted at or on the struts 24 and there is shown a pair of diametrically opposite radially extending blades. These blades are of controllable pitch, in that they can be trimmed from an absolutely flat (or even negative) pitch to a pitch wherein the blades lie in a plane coincidental with the fuselage axis. It is contemplated that the blades D have equal camber at opposite sides whereby their lift is neutral and to the end that oppositely extending blades form a pair of wings extending diametrically within the ring-wing B and through the fuselage A. Thus, the ring-wing B can be stopped and locked with the blades D extending horizontally so as to act as planing air foils.

The thrust means E is preferably in the form of a pair of jet propulsion units carried at the periphery of the ring-wing B, at diametrically opposite positions. As is shown, the units of means E are carried at the terminal ends of the oppositely projecting struts 24 where they are pitched similarly to or the same as the blades D. For example, the struts 24 can be pilot controlled through a mechanism within the hub 13 in order to simultaneously turn, in which case both blades D and thrust means E are turned to vary the pitch. Thus, the thrust units E are disposed on axes coincidental with and intersecting the neutral planes of the blades D to which they are appended.

In the case illustrated, the means E are appended to the exterior of the ring-wing B and they are ram-jet units that take advantage of the peripheral and/or forward speed of the said wing. Although the particular kind of thrust unit does not enter into this disclosure it is apparent that a jet producing means utilizing the ram air principle can be used to great advantage since the velocity of ram air can be kept constant regardless of the forward motion of the aircraft. Therefore, high lift can be obtained at initial take-off and on landing, as well as during hovering operation.

The thrust means E is supplemented by additional means E' and E'', each of which is adapted to drive the craft forward independently of the other. As shown in FIG. 6 of the drawings, the thrust means E' can be a rocket engine located in the tail section 11 and adapted to assist the means E in accelerating the craft to super-sonic speeds. Having attained the desired forward speed the ring-wing B can be used to support combustion through its inherent capability of capturing air-flow simultaneously with its function of cancelling shock waves eminating from the nose section 10. Thus, the thrust means E'' comprises fuel injection nozzles located within the ring-wing B and which discharge fuel into an area of compressed and heated air, thereby operating the ring-wing B and fuselage A combination as a super-sonic ram-jet engine and which itself supplies forward thrust with or without the thrust means E and/or E'. As a result, the aircraft can be designed for efficient operation at a predetermined speed and at which speed the ram-jet thrust means E'' is efficient and so that the rocket thrust means E' and/or first described thrust means E need not be used. Further, it will be apparent that various efficient speeds of operation can be built into the craft, by providing the means E, E', and E'' efficiently operable at varied speeds as circumstances require.

From the foregoing it will be apparent that I have provided an aircraft suitable for vertical take-offs and landings, and hovering, and when in the latter attitudes it has a low down wash velocity with many advantages over conventional VTOL aircraft. With the structure hereinabove described, lift, propulsion, and stability are uniquely combined in the rotating ring-wing B which after take-off will generate efficient hovering capabilities, approximately 7 lbs./H.P. at $30\#/ft.^2$, as a ducted or shrouded propeller. For normal category flight, that is horizontal flight, at high Mach numbers (Mach 3.0), it can be shown that the drag will be lower than in super-sonic devices using conventional straight-wing or swept-wing systems for lift. The graph of FIG. 5 demonstrates the phenomenon involved in this reduction of drag. The ring-wing as herein disclosed, at a specified Mach number for which it is designed and must cruise, causes a cancellation of the compression shock waves generated at the nose section by expansion waves generated at the aft section. The reflection characteristics of the centrally positioned ring-wing and fuselage interaction can be shown to cancel the wave drag component completely, and the overall result is that the fuselage and ring-wing combination will have a minimum drag of the character shown in FIG. 5.

Stability and control of the instant aircraft is unique and in the critical hovering and transition areas between hovering and horizontal flight, stability and control is established by the rotating ring-wing which furnishes direct gyro stability. The usual disturbing reactions due to gusts are most effectively resisted by the gyroscopic action and manually operated flight controls located in the down wash adequately effect precession for control of the said gyroscopic action. Further, reaction rockets 120 and 122 can be installed at the nose 10 and empenage C respectively and disposed in right angularly related planes to control pitch and roll. At cruising speeds and in horizontal flight the ring-wing is non-rotating, or fixed, and the control of the aircraft can be conventional in nature. With ram jet propulsion, velocity of the ram jet units can be kept constant and the blades D will operate at maximum r.p.m. during take-offs and landings, and gradually lower r.p.m. as the aircraft approaches cruising speed. The main power control will be by changing the pitch of the blades cooperatively with changing the engine thrust. Briefly summarized, the aircraft hereinabove described can cruise supersonically at low drag, equivalent to those aircraft which cruise below the speed of sound. Extreme manueverability, rate of climb, and positive gyroscopic stability in hovering, and low down wash velocity (150 ft./sec.) are realized.

As is clearly illustrated, the aircraft hereinabove described is particularly adapted for use as a launch vehicle (see FIG. 2) wherein a secondary vehicle V is separably attached to the nose section 10. Upon separation in flight, by use of suitable release means, the vehicle V is independently operable and the launch vehicle remains intact with a forward section of reduced configuration unsuitable for high speed operation, whereupon the said launch vehicle is inherently braked to a slower speed and so as to insure distant separation from the vehicle V.

Having described only a typical preferred form and application of my invention, I do not wish to be limited or restricted to the specific details herein set forth, but wish to reserve to myself any modifications or variations that may appear to those skilled in the art and fall within the scope of the following claims.

Having described my invention, I claim:

1. An aircraft for horizontal flight and capable of vertical take-offs and landings, and including, an elongated streamline fuselage, a revolvable ring-wing encircling the fuselage, thrust means rotating the ring-wing relative to the fuselage, and propeller means carried by the ring-wing and operable to revolve in the duct space between the fuselage and wing, whereby thrust is applied longitudinally of said fuselage.

2. A supersonic aircraft for horizontal flight and capable of vertical take-offs and landings, and including, an elongated streamline fuselage, a revolvable ring-wing encircling the fuselage, thrust means rotating the ring-wing relative to the fuselage, propeller means carried by the ring-wing and operable to revolve in the duct space between the fuselage and wing for subsonic operation, and thrust means comprising ram-jets operable in the duct space between the fuselage and wing for supersonic operation, whereby compression of air within said duct space supports combustion.

3. An aircraft for horizontal flight and capable of vertical take-offs and landings, and including, an elongated streamline fuselage, a revolvable ring-wing encircling the fuselage, means rotating the ring-wing relative to the fuselage, air propelling blades carried by the ring-wing and operable in the duct space between the fuselage and wing, whereby thrust longitudinally of said fuselage can be utilized for both vertical lift and for horizontal thrust, and an empennage at one end of the fuselage to control attitude of the same.

4. An aircraft for horizontal flight and capable of vertical take-offs and landings, and including, an elongated streamline fuselage having a nose section and a tail section, a revolvable ring-wing encircling the fuselage, means rotating the ring-wing relative to the fuselage, air propelling blades carried by the ring-wing and operable in the duct space between the fuselage and wing, whereby thrust longitudinally of said fuselage can be utilized for both vertical lift and for horizontal thrust, and an empennage at the tail section controlling attitude of the fuselage.

5. An aircraft for horizontal flight and capable of vertical take-offs and landings, and including, an elongated streamline fuselage, a ring-wing rotatably encircling the fuselage, air propelling blades projecting radially from a hub journalled on the fuselage to carry the ring-wing, whereby gyro stability and thrust can be utilized in vertical attitudes, and an empennage at one end of the fuselage and operable in the air flow of the said blades for precessing control of gyrocscopic action.

6. An aircraft for horizontal flight and capable of vertical take-offs and landings, and including, an elongated streamline fuselage, a ring-wing rotatably encircling the fuselage, air propelling blades projecting radially from a hub journalled on the fuselage to carry the ring-wing, whereby gyro stability and thrust can be utilized in vertical attitudes and thrust can be utilized in horizontal attitudes, and an empennage at one end of the fuselage and operable in the air flow of said blades for precessing control of gyroscopic action and for directional control in horizontal flight.

7. An aircraft for horizontal flight and capable of vertical take-offs and landings, and including, an elongated streamline fuselage, a ring-wing rotatably encircling the fuselage, air propelling blades projecting radially from a hub journalled on the fuselage to carry the ring-wing, and thrust means at the periphery of the ring-wing to rotate the same, whereby gyrostability and thrust can be utilized in vertical attitudes.

8. An aircraft for horizontal flight and capable of vertical take-offs and landings, and including, an elongated streamline fuselage, a ring-wing encircling the fuselage, air propelling blades operable in the duct spaces between the fuselage and wing, and thrust means at the periphery of the blades and adjustably pivoted on a radial axis in order to provide both circumferential and longitudinal thrust, whereby thrust longitudinally of said fuselage can be utilized for both vertical lift and for horizontal thrust.

9. An aircraft for horizontal flight and capable of vertical take-offs and landings, and including, an elongated streamline fuselage, a ring-wing encircling the fuselage, air propelling blades operable in the duct space between the fuselage and wing, thrust means at the periphery of the blades and adjustably pivoted on a radial axis in order to provide both circumferential and longitudinal thrust, whereby thrust longitudinally of said fuselage can be utilized for both vertical lift and for horizontal thrust, and an empennage at one end of the fuselage to control attitude of the same.

10. An aircraft for horizontal flight and capable of vertical take-offs and landings, and including, an elongated streamline fuselage, a ring-wing rotatably encircling the fuselage, air propelling blades projecting radially from a hub journalled on the fuselage to carry the ring-wing, thrust means at the periphery of the ring-wing and adjustably pivoted on a radial axis in order to provide both circumferential and longitudinal thrust, whereby gyro stability and thrust can be utilized in vertical attitudes, and and an empennage at one end of the fuselage for precessing control of gyroscopic action.

11. An aircraft for horizontal flight and capable of vertical take-offs and landings, and including, an elongated streamline fuselage, a ring-wing rotatably encircling the fuselage, air propelling blades projecting radially from a hub journalled on the fuselage to carry the ring-wing, thrust means at the periphery of the ring-wing and adjustably pivoted on a radial axis in order to provide both circumferential and longitudinal thrust, whereby gyro stability and thrust can be utilized in vertical attitudes, and an empennage at one end of the fuselage for precessing control of gyroscopic action and for directional control in horizontal flight.

12. An aircraft for travel at supersonic horizontal speed and capable of vertical take-offs and landings, and including, an elongated streamline fuselage, a ring-wing rotatably encircling the fuselage intermediate the opposite ends thereof and positioned to intercept and cancel shock-waves emanating from the fuselage at said supersonic speed, a pair of diametrically opposite air propelling blades projecting radially from a hub journalled on the fuselage to carry the ring-wing, and diametrically opposite thrust means at the periphery of the ring-wing to rotate the same, whereby gyro stability and thrust can be utilized in vertical attitudes.

References Cited by the Examiner

UNITED STATES PATENTS

| | | | |
|---|---|---|---|
| 2,649,266 | 8/1953 | Darrieus | 114—66.5 |
| 2,971,724 | 2/1961 | Von Zborowski | 244—34 |
| 3,065,932 | 11/1962 | Herrmann | 244—34 |
| 3,135,484 | 6/1964 | Herrmann | 244—34 |

MILTON BUCHLER, *Primary Examiner.*

L. C. HALL, *Assistant Examiner.*